United States Patent [19]
Calvo

[11] Patent Number: 5,640,058
[45] Date of Patent: Jun. 17, 1997

[54] KITS FOR CONVERTING DC BATTERY POWERED SMOKE DETECTORS TO AC POWER WITH BATTERY BACK-UP

[76] Inventor: Salvatore Calvo, 391 Andrews Rd., Mineola, N.Y. 11501

[21] Appl. No.: 423,921

[22] Filed: Apr. 13, 1995

[51] Int. Cl.$^6$ .................................................. H02J 9/06
[52] U.S. Cl. ..................... 307/66; 340/628; 340/627; 169/23; 169/51; 169/52; 363/15; 363/39; 363/74; 363/84; 363/108
[58] Field of Search .................... 307/66, 64; 340/628, 340/627; 169/23, 51, 52; 363/15, 30, 74, 84, 108, 126

[56] References Cited

U.S. PATENT DOCUMENTS

| | | | |
|---|---|---|---|
| 3,363,109 | 1/1968 | Wilhelm | 307/12 |
| 4,334,275 | 6/1982 | Levine | 364/551 |
| 4,380,760 | 4/1983 | Kornblit | 340/628 |
| 4,419,658 | 12/1983 | Jarosz et al. | 340/521 |
| 5,019,805 | 5/1991 | Curl et al. | 340/628 |
| 5,135,567 | 8/1992 | Chimento | 340/691 |
| 5,157,271 | 10/1992 | Fujiwara | 307/66 |
| 5,315,292 | 5/1994 | Prior | 340/628 |
| 5,382,341 | 1/1995 | Aroutiounian et al. | 204/192.21 |
| 5,384,562 | 1/1995 | Greenfield | 340/584 |
| 5,461,367 | 10/1995 | Altavela et al. | 340/584 |

OTHER PUBLICATIONS

Radio Shack Corporation Catalog, 1984 p. 113 Jan. 1, 1984.

Primary Examiner—William M. Shoop, Jr.
Assistant Examiner—Albert W. Paladini
Attorney, Agent, or Firm—Galgano & Burke

[57] ABSTRACT

Methods, circuits, and kits for converting battery powered smoke detectors to AC power include a power converter which converts standard household AC voltage to a DC voltage suitable for use by a battery powered smoke detector and a battery clip connector for connecting the power converter to the battery clips of a battery powered smoke detector. According to one embodiment of the invention, a light emitting diode is coupled to the battery clip connector to indicate the presence or absence of DC voltage at the smoke detector. According to another embodiment of the invention, several battery powered smoke detectors are coupled to a single power converter. In yet another embodiment of the invention, several battery powered smoke detectors are provided with an AC power supply having an automatic battery back-up power supply. Preferred aspects of the invention include: providing the battery backed-up AC power supply with a battery tester and providing fuses for each smoke detector and for the battery.

19 Claims, 3 Drawing Sheets

KITS FOR CONVERTING DC BATTERY POWERED SMOKE DETECTORS TO AC POWER WITH BATTERY BACK-UP

BACKGROUND OF THE INVENTION

1. Field of the Invention

The invention relates to smoke detectors. More particularly, the invention relates to methods and circuits for converting battery powered smoke detectors to AC power with battery back-up and to kits incorporating the methods and circuits.

2. State of the Art

Today, smoke detectors are commonly found in most homes. Local building codes and insurance companies often require that smoke detectors be installed in newly constructed buildings and in commercial buildings. Moreover, public awareness of the benefits of smoke detectors and their relatively low cost have made them universally popular. Almost all household smoke detectors are battery powered in order to simplify installation by the homeowner. Prior art FIG. 1 shows a typical battery powered smoke detector 10 found in most homes. The smoke detector 10 includes a circular base 12 having mounting holes 14 and 16. A circuit board 18 is attached to the base 12 and includes a smoke sensor 20 and a sound transducer 22. A 9-volt battery 24 is electrically coupled to the circuit board by battery clips 26. The smoke detector 10 is easy to install, is relatively unobtrusive, and is very reliable provided that the battery is in good condition. Indeed, many homeowners now realize that while the battery powered smoke detector is easy to install, it is difficult to maintain. The battery should be checked once a month and usually needs to be replaced once or twice a year. Testing and replacing the battery often requires the use of a ladder since smoke detectors are advantageously installed on ceilings or high on walls in order to detect smoke which rises to the ceiling. Since most homes now contain at least one smoke detector on each level of the house, a monthly ritual of carrying a ladder to each smoke detector and climbing up and down the ladder several times is bothersome and can also be hazardous. As a result, most homeowners simply do not bother to test the batteries in the smoke detectors. This, of course, creates an even greater hazard that the smoke detector will fail due to a dead or weak battery.

Commercial smoke detectors, on the other hand, are almost always AC powered with a battery back-up. While these smoke detectors are more complicated to install, they are virtually mandatory in a commercial building where dozens or hundreds of smoke detectors are used and where it would be extremely time consuming to test so many batteries on a monthly basis.

Recently, AC powered smoke detectors have become available for home use and some homeowners have replaced their battery powered smoke detectors with AC powered detectors. Unfortunately, the battery powered smoke detectors must be discarded since there is presently no way to adapt them for use with AC power.

SUMMARY OF THE INVENTION

It is therefore an object of the invention to provide methods and circuits for adapting a battery powered smoke detector for use with AC power.

It is also an object of the invention to provide methods and circuits for converting a battery powered smoke detector to an AC powered smoke detector having a battery backup.

It is another object of the invention to provide methods and circuits for connecting a number of battery powered smoke detectors to an AC power supply having a battery back-up.

It is still another object of the invention to provide an AC power supply for a battery powered smoke detector which is inexpensive and easy to install.

It is yet another object of the invention to provide an AC power supply for a battery powered smoke detector which includes a power failure indicator.

It is still another object of the invention to provide an easy to use kit for use by a homeowner to quickly and inexpensively convert existing battery powered smoke detectors to AC power with a battery back-up.

In accord with these objects which will be discussed in detail below, the methods and circuits of the present invention include a power converter which converts standard household AC voltage to a DC voltage suitable for use by a battery powered smoke detector and a battery clip connector for connecting the power converter to the battery clips of a battery powered smoke detector. According to one embodiment of the invention, a light emitting diode is coupled to the battery clip connector to indicate the presence or absence of DC voltage at the smoke detector. According to another embodiment of the invention, several battery powered smoke detectors are coupled to a single power converter. In yet another embodiment of the invention, several battery powered smoke detectors are provided with an AC power supply having an automatic battery back-up power supply.

Preferred aspects of the invention include: providing the battery backed-up AC power supply with a battery tester and providing fuses for each smoke detector and for the battery. Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
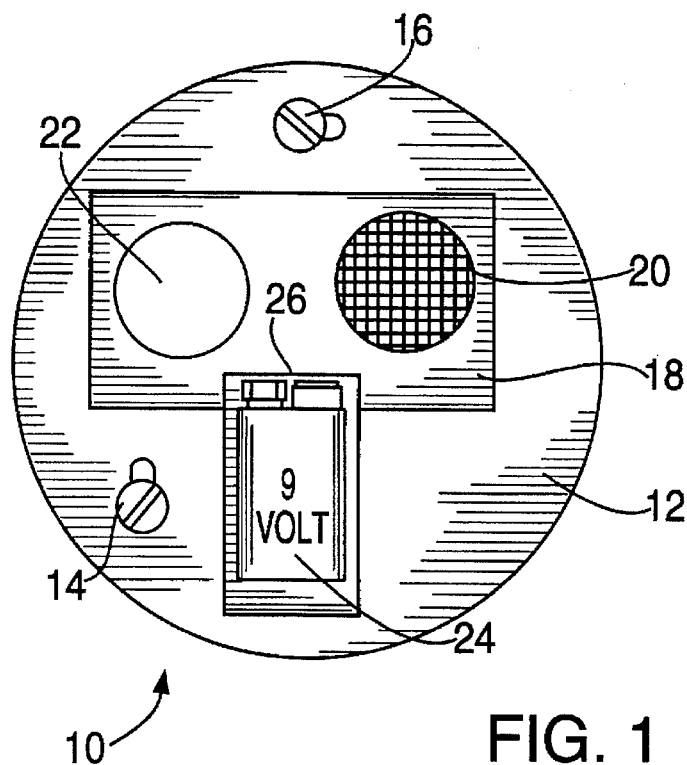
FIG. 1 is a schematic view of a prior art battery powered smoke detector.
Figure 2:
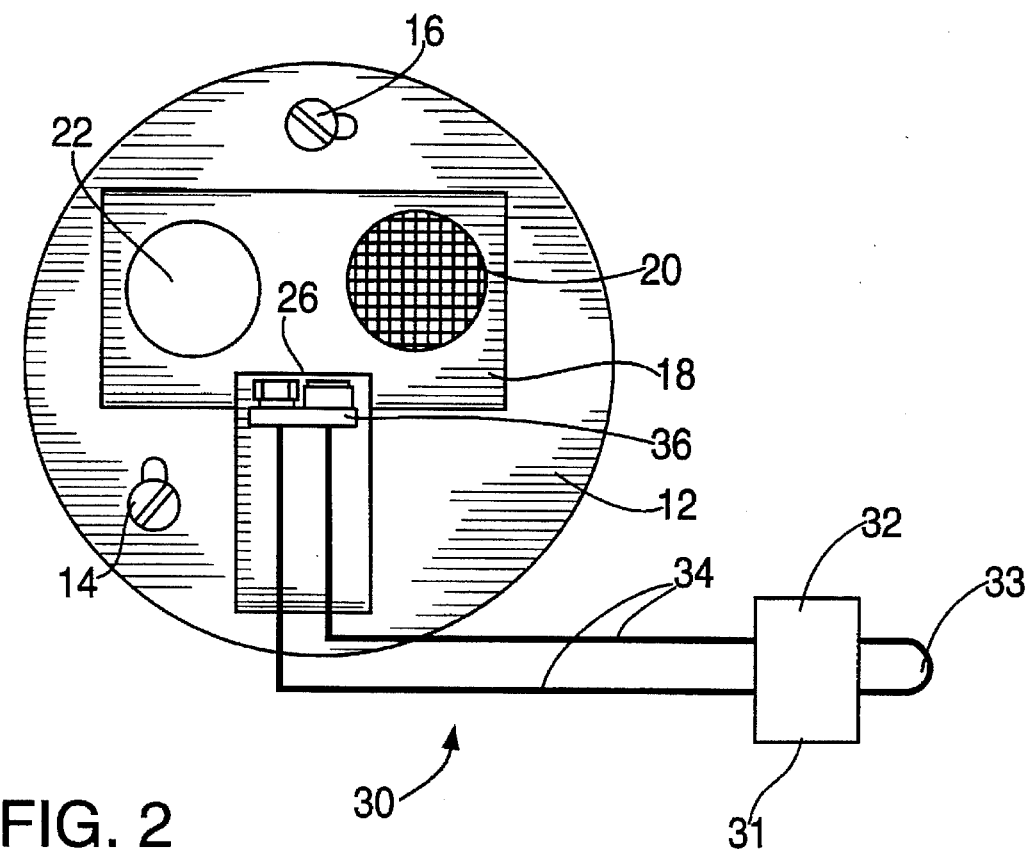
FIG. 2 is a schematic view of a prior art battery powered smoke detector converted to AC power according to a first embodiment of the invention.
Figure 3:
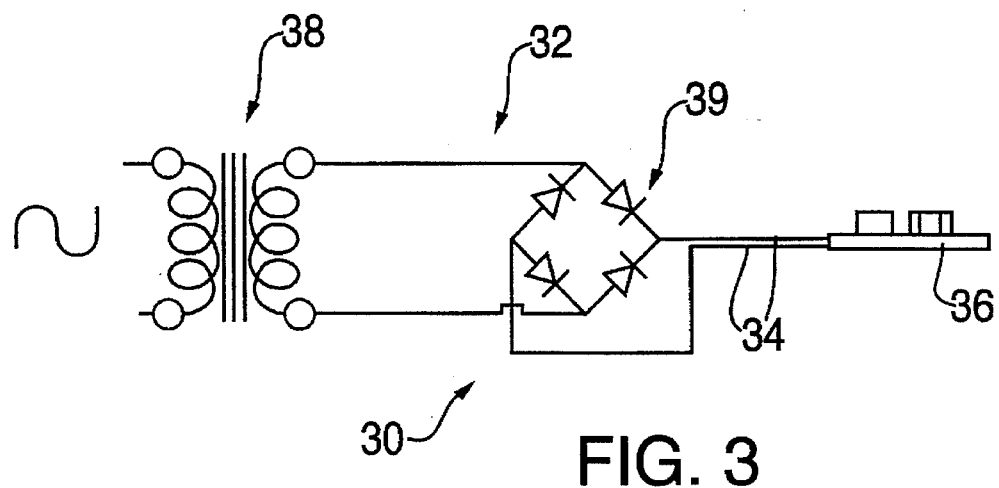
FIG. 3 is a schematic diagram of the power converter used in the first embodiment of the invention.

Referring now to FIGS. 2 and 3, according to a first embodiment of the invention, a conventional battery powered smoke detector 10 is adapted to AC power by providing a power converter kit 30. The converter kit 30 includes a power converter 32, a two conductor wire 34, and a battery clip connector 36. The power converter 32 includes a step-down transformer 38 which reduces standard household AC voltage (typically 110–120 volts) to a low voltage (typically 9-volts). A rectifier 39 converts the low voltage AC output of the transformer 38 to a DC voltage. The transformer 38 and the rectifier 39 are preferably contained in a small housing 31 which includes an integral plug 33 for connecting the transformer to the AC mains of the house.

The output of the power converter 32 is coupled by the two conductor wire 34 to the battery clip connector 36. The converter kit 30 is coupled to the smoke detector 10 by removing the battery from the smoke detector and attaching the battery clip connector 36 to the battery clips 26 of the smoke detector. The power converter 32 is then plugged into a wall outlet. It will be appreciated that the wire 34 must be long enough to reach from a wall outlet to the smoke detector. In a kit according to the invention, an extra long wire is provided and according to a method of the invention, the wire is cut to size before the battery clip connector 36 is coupled to the wire. According to this first embodiment, the power converter 32 produces a DC voltage of approximately 9-volts and 800 milliamps, the power required by most battery powered smoke detectors. It will be appreciated, however, that some smoke detectors may have different power requirements (e.g. 12-volts), in which case, the power converter 32 will produce a different output. In a kit according to the invention, the power converter 32 may be provided with a switch-selectable output. Moreover, as shown herein, the battery clip connector 36 is designed to replace a standard 9-volt battery. However, in a kit according to the invention, several different battery clip connectors may be provided for connection to smoke detectors which use different types of batteries.

Figure 4:
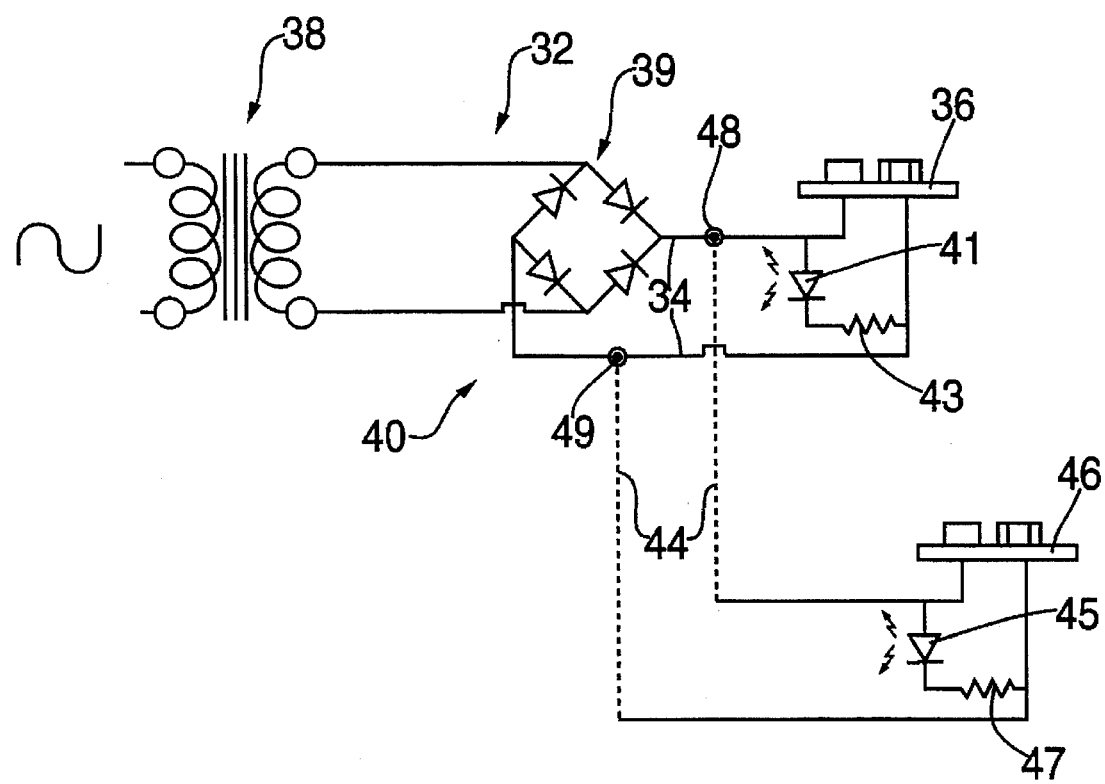
FIG. 4 is a schematic diagram of a second embodiment of the invention.

Turning now to FIG. 4, according to a second embodiment of the invention, a converter kit 40 includes a similar power converter 32, wire 34, and battery clip connector 36. In this embodiment, an LED 41 and resistor 43 are coupled in series across the terminals of the battery clip connecter 36. The LED will light when power is being supplied to the smoke detector. According to a method of the invention, a small hole is drilled in the smoke detector and the LED is placed in or near the hole so that the status of power supplied to the smoke detector may be visually determined by looking at the smoke detector. According to another aspect of the invention, the power converter 32 is provided with terminals 48, 49 and the kit 40 includes additional wires 44 and battery clip connectors 46 with LEDs 45 and resistors 47 as described above. Thus, a single kit 40 according to the invention can be used to convert several smoke detectors using a common power converter 32.

Figure 5:
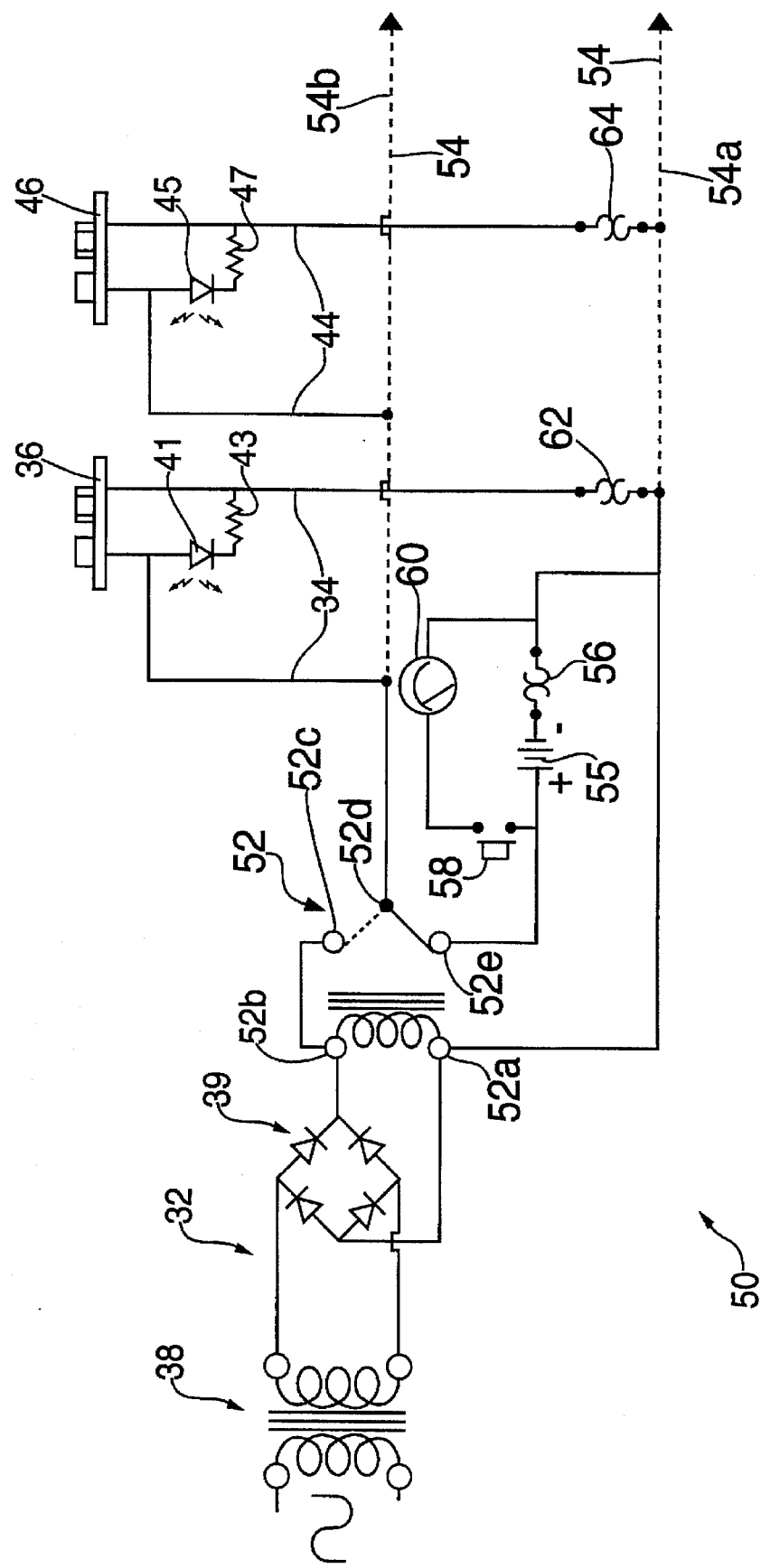
FIG. 5 is a schematic diagram of a third embodiment of the invention.

Turning now to FIG. 5, a deluxe kit 50 according to the invention, includes a power converter 32, a single pole-double throw relay switch 52, and a back-up battery 55. According to the presently preferred embodiment, the coil of relay 52 is coupled at terminals 52a, 52b to the output of the power converter 32 so that the relay is activated when power is being supplied by the power converter 32. As seen in FIG. 5, the relay 52 is shown in its normal position when no power is being supplied by the power converter 32. Terminal 52a serves as a common power terminal which is coupled to a first conductor 54a of the wire 54. Terminal 52b is coupled to one of the contacts 52c of the relay and the other contact 52e of the relay is coupled to one pole of the battery 55, the other pole of which is coupled to the first conductor 54a of the wire 54. The common pole 52d of the relay is coupled to the other conductor 54b of the wire 54. It will be appreciated, therefore, that when the relay is energized power from the power converter 32 is coupled to the conductors 54a and 54b of the wire 54 and the battery 55 is uncoupled from the conductor 54b. When power fails at the power converter 32, the relay is no longer energized and returns to the position shown in FIG. 5 where the battery 55 is coupled to both conductors 54a and 54b and the output of the power converter 32 is uncoupled from conductor 54b.

According to the presently preferred embodiment, the battery 55 is series connected with a fuse 56 so that it is disconnected from the circuit in the event of a failure of the relay. A battery test meter 60 is preferably provided in the circuit kit and is wired to the battery via a momentary-on push button 58. Several smoke detectors (not shown) may be coupled to the battery backed-up converter kit in a manner similar to that described above with reference to FIG. 4. Each battery clip connector 36, 46, etc. with associated LED 41, 45, etc. and resistor 43, 47, etc. is connected by wires 34, 44, etc. to the wires 54 as shown. Preferably, each smoke detector connection is provided with a fuse 62, 64, etc. so that a short in any one smoke detector will not disable the other smoke detectors.

The connections made in the circuits described may be soldered connections or may be made with non-soldered terminal strip type connectors which would be supplied with a kit according to the invention. The resistors used for the LEDs are preferably 1500 ohm, half watt resistors and the battery is preferably a 12-volt lantern battery. The fuses used for the smoke detector connections should preferably be fast acting ¼ to ⅓ amp fuses and the fuse used to protect the battery should preferably be a one amp fuse. The wire used to make the connections described is preferably twenty gauge stranded copper wire and the battery test meter is preferably a 15-volt meter which indicates a bad battery at and below 8-volts.

There have been described and illustrated herein several embodiments of a methods, circuits and kits for converting battery powered smoke detectors to AC power and to AC power with battery back-up power. While particular embodiments of the invention have been described, it is not intended that the invention be limited thereto, as it is intended that the invention be as broad in scope as the art will allow and that the specification be read likewise. Thus, while particular values of voltages, resistances and currents have been disclosed, it will be appreciated that other values could be utilized depending on the circumstances known to those skilled in the art. Also, while kits have been shown with reference to one or two smoke detectors, it will be recognized that other numbers of smoke detectors could be used with similar results obtained. Moreover, while particular configurations have been disclosed in reference to the power converter and the relay switch, it will be appreciated that other configurations could be used as well. Furthermore, while the invention has been disclosed as having an LED indicator at each smoke detector, it will be understood that a single LED indicator at one of the smoke detectors can achieve the same or similar function as disclosed herein. It will therefore be appreciated by those skilled in the art that yet other modifications could be made to the provided invention without deviating from its spirit and scope as so claimed.

What is claimed is:

1. A kit for converting a battery powered smoke detector to AC power where the smoke detector has a battery clip for connecting it to a battery, said kit comprising:
   a) a power converter including a transformer and a rectifier;
   b) a battery clip connector for connecting said power converter to the battery clip of the smoke detector;
   c) a length of two conductor wire for connecting said battery clip connector to said power converter;
   d) an LED indicator for coupling to said battery clip connector to indicate when power is supplied to the smoke detector;
   e) a relay switch for selectively coupling said power converter to said battery clip connector; and f) means for connecting to a back-up battery,
   said connecting means for coupling to said relay switch so that when said power converter fails to supply power to said battery clip connector, said relay switch couples a back-up battery to said battery clip connector.

2. A kit according to claim 1, for converting a plurality of battery powered smoke detectors to AC power, said kit further comprising:
   g) a plurality of battery clip connectors; and
   h) a length of two conductor wire which is long enough so that when cut into a plurality of lengths of wire corresponding to said plurality of battery clip connectors, each battery clip connector can be connected to said power converter.

3. A kit according to claim 2, further comprising:
   i) a plurality of LED indicators for coupling to respective of said plurality of battery clip connectors to indicate when power is supplied to the plurality of smoke detectors.

4. A kit according to claim 1, further comprising:
   g) a resistor for coupling said LED indicator to said battery clip connector.

5. A kit according to claim 3, further comprising:
   j) a plurality of resistors for coupling respective of said LED indicators to respective of said plurality of battery clip connectors.

6. A kit according to claim 1, further comprising:
   g) a fuse for coupling in series with said battery clip connector and said power converter.

7. A kit according to claim 2, further comprising:
   j) a plurality of fuses for respective coupling in series with said plurality of battery clip connectors and said power converter.

8. A kit according to claim 3, further comprising:
   j) a plurality of fuses for respective coupling in series with said plurality of battery clip connectors and said power converter.

9. A kit according to claim 1, further comprising:
   g) a battery test meter; and
   h) a push button for momentarily coupling said battery test meter to said back-up battery.

10. A kit according to claim 9, further comprising:
    i) a battery fuse for series connection with said back-up battery.

11. A kit according to claim 2, further comprising:
    i) a battery test meter; and
    j) a push button for momentarily coupling said battery test meter to said back-up battery.

12. A kit according to claim 11, further comprising:
    k) a battery fuse for series connection with said back-up battery.

13. A kit according to claim 3, further comprising:
    j) a battery test meter; and
    k) a push button for momentarily coupling said battery test meter to said back-up battery.

14. A kit according to claim 13, further comprising:
    l) a battery fuse for series connection with said back-up battery.

15. A kit according to claim 7, further comprising:
    j) a battery test meter; and
    k) a push button for momentarily coupling said battery test meter to said back-up battery.

16. A kit according to claim 15, further comprising:
    l) a battery fuse for series connection with said back-up battery.

17. A kit according to claim 1, further comprising:
    g) a back-up battery connectable to said connecting means.

18. A kit according to claim 2, further comprising:
    i) a back-up battery connectable to said connecting means.

19. A kit for converting a battery powered smoke detector to AC power where the smoke detector has a battery clip for connecting it to a battery, said kit comprising:
    a) a power converter including a transformer and a rectifier;
    b) a battery clip connector for connecting said power converter to the battery clip of the smoke detector;
    c) a length of two conductor wire for connecting said battery clip connector to said power converter; and
    d) a relay switch for selectively coupling said power converter to said battery clip connector, and
    e) means for connecting to a back-up battery,
       said connecting means for coupling to said relay switch so that when said power converter fails to supply power to said battery clip connector, said relay switch couples a back-up battery to said battery clip connector.

* * * * *